CLARK M. LANGLEY'S.
IMPROVED GOVERNOR
FOR STEAM AND OTHER ENGINERY

117548 PATENTED AUG 1 1871

Inventor.
Clark M. Langley

Witnesses
Geo. C. Pevey,
Samuel H. Merrill

UNITED STATES PATENT OFFICE.

CLARK M. LANGLEY, OF LOWELL, MASSACHUSETTS.

IMPROVEMENT IN GOVERNORS FOR STEAM-ENGINES.

Specification forming part of Letters Patent No. 117,548, dated August 1, 1871; antedated July 18, 1871.

*To all whom it may concern:*

Be it known that I, CLARK M. LANGLEY, of Lowell, in the county of Middlesex and State of Massachusetts, have invented new and useful Improvements in Governors for Steam and other Enginery; and I do hereby declare that the following is a full and exact description thereof, reference being had to the accompanying drawing and to the letters of reference marked thereon.

The nature of my invention consists in providing a governor for steam and other enginery; its several parts consisting of a pulley and cog-wheel, or their equivalents, between which works a rod which connects with and operates the gate or valve for the purpose of graduating the supply of power to the resistance to be overcome, thus giving a uniform speed regardless of the load or pressure on the same.

To enable others skilled in the art to make and use my invention, I will proceed to describe its construction and operation.

Figure 1:
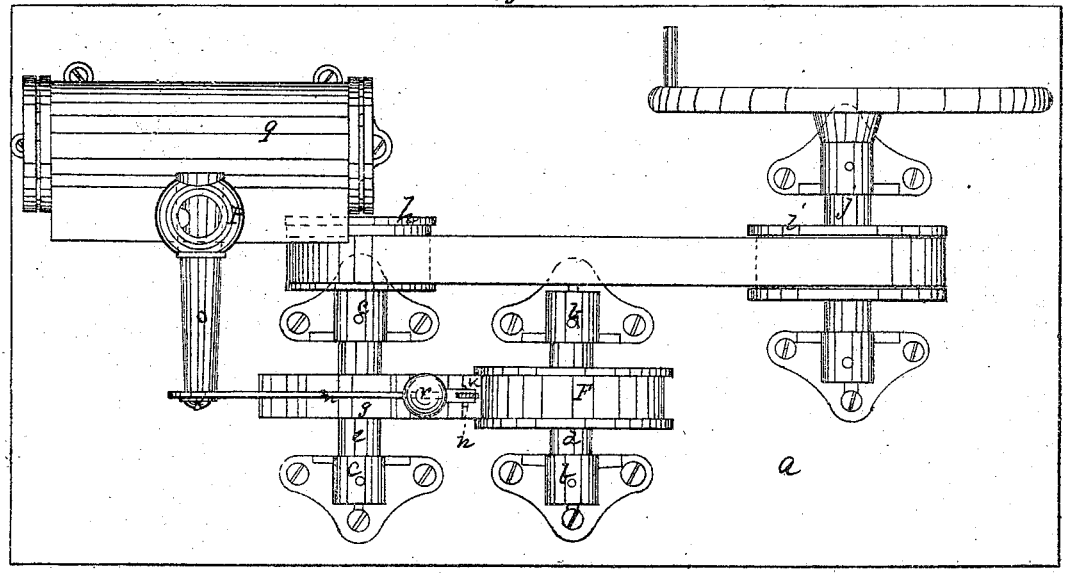
Figure 2:
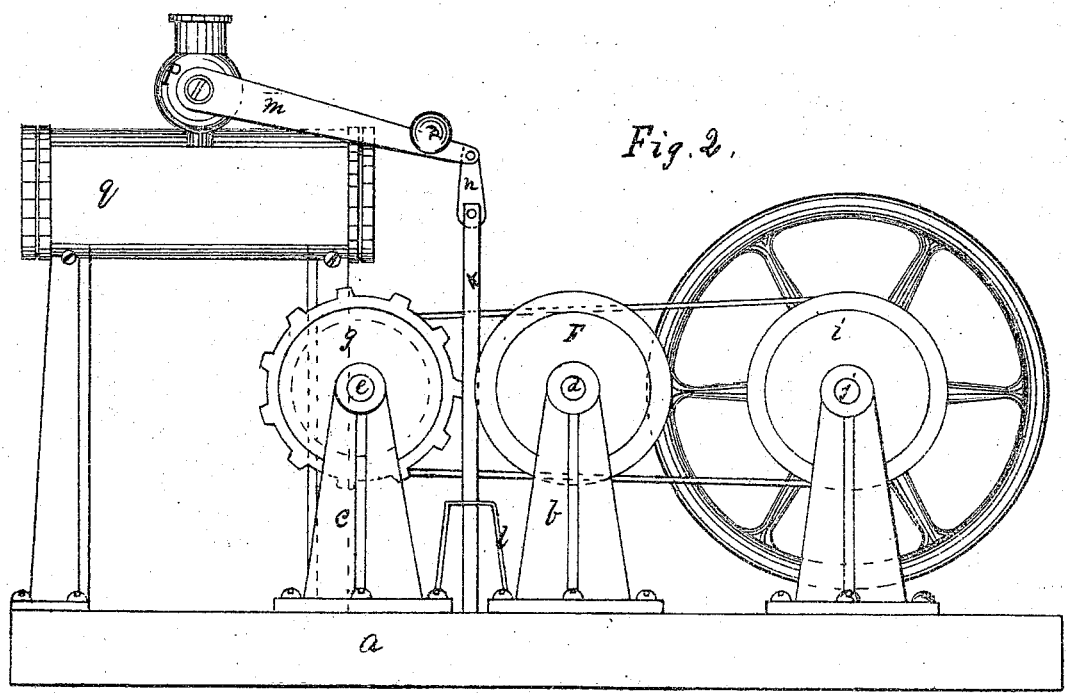

Figure 1 represents a plan of my improved governor for steam and other enginery. Fig. 2 represents a side elevation of the same.

Similar letters in the different figures indicate corresponding parts.

A represents the bed-piece of the engine, on the top of which are firmly secured the requisite stands $b\ b$ and $c\ c$, which are provided with bearings for the reception of the shafts $d$ and $e$. To the shaft $d$ is secured the friction-wheel or pulley $f$. To the shaft $e$ is secured the cog-wheel $g$ of the desired number of teeth of any form, size, or shape. Although the same results would be obtained if the wheels $f$ and $g$ were both alike, in this case the wheel $g$ would have to oscillate and rotate at the same time, these wheels $f$ and $g$ being of the size required. Secured to the shaft $e$ is the driven pulley $h$, which connects, by means of a belt, with the driving-pulley $i$, this pulley $i$ being firmly secured to the crank-shaft $j$, from which motion or power is imparted to the wheel $g$. Operating between the wheels $f$ and $g$ is what I term a rod, $k$, which is provided at one end with a suitable stand, $l$, forming a support and guide for the same, the other end of this rod K connecting with the arm or lever $m$ by means of a toggle-joint, $n$, the other end of this lever or arm $m$ being secured to the valve-stem or gate $o$, which operates in the valve or gate $p$, it being located between the supply of power and cylinder $q$, which, when open, supplies the same with power. Sliding on the arm or lever $m$ is the weight $r$, which aids the operator in adjusting the governor so as to give the number of revolutions or speed desired, although the number of revolutions (which I have found by actual experiments) can be governed by having the wheel $g$ adjustable, so as to give more or less friction to the rod K when operating the same.

The governor, being thus constructed and its several parts adjusted in position, is then ready for use. Power is then supplied to the engine; the valve or gate $p$ being open, allows the same to operate the machine, causing the crank-shaft $j$ to revolve, which, by aid of the belt, communicates motion from the driving-pulley $i$ to the driven pulley $h$, thence to the wheel $g$, thus operating the rod $k$. The number of revolutions or speed of the engine required being ascertained, the weight $r$ is then adjusted on the arm $m$, as required, keeps the rod $k$ suspended so as to operate and regulate the valve or gate $p$, giving more or less power, as the case may require and demanded by the load or pressure of power on the engine. When a greater load or more of the machinery is at work, more power is required to drive the engine to give the required number of revolutions, which causes the engine for an instant to run with less speed, which acts instantly on the wheel $g$, thus giving a less number of revolutions of the same corresponding with the decrease of speed of the engine, which allows the rod $k$ to fall further. This action of the rod, by aid of the arm $m$, opens the valve or gate $p$, which supplies the engine with the required amount of power, as demanded. When a part of the machinery is removed or at rest, the engine will run at a greater speed than is required. This action causes a corresponding increase of speed of the wheel $g$, which raises the rod $k$, closing the valve or gate $p$, thus decreasing the supply of power to the engine, thus regulating the speed as required. The same results would be obtained if two cog-wheels, $g$, were used. In this case they would have to be geared together so as to allow the teeth or cogs on each wheel to catch the rod $k$ at the same instant, in order to control the valve or gate $p$, giving more or less power to the engine, as demanded. Furthermore, two plain wheels or pulleys, $f$, may be used, if desired, giving the same results. In this case one of the wheels would be provided with an oscillating motion in addition to the rotary motion, which would allow the rod $k$ to rise and fall to operate the valve or gate $p$, as demanded by the engine.

Thus it will be seen I am enabled to furnish a governor for steam and other enginery at a much less rate than those now in common use, being simple in its construction, durable, and easily kept in repair, and one that will graduate the supply of power to the resistance to be overcome, thus giving a uniform speed regardless of the load on the same.

What I claim as my invention, and desire to secure by Letters Patent, is—

The combination and arrangement of the rods M and $k$ with the wheels $f$ and $g$, substantially as herein set forth.

CLARK M. LANGLEY.

Witnesses:
 GEO. E. PEVEY,
 SAMUEL H. MERRILL.